United States Patent [19]
Wong

[11] Patent Number: 5,732,906
[45] Date of Patent: Mar. 31, 1998

[54] NOSE LANDING GEAR ASSEMBLY FOR A CATAPULT LAUNCHED AIRPLANE

[75] Inventor: Alan J. Wong, Issaquah, Wash.

[73] Assignee: The Boeing Company, Seattle, Wash.

[21] Appl. No.: 647,517

[22] Filed: May 14, 1996

[51] Int. Cl.$^6$ .............................. B64F 1/04; B64F 1/06; B64C 25/14
[52] U.S. Cl. ............................ 244/63; 244/102 A
[58] Field of Search ................... 244/63, 102, 102 A, 244/104 R

[56] References Cited

U.S. PATENT DOCUMENTS

| | | | |
|---|---|---|---|
| 2,467,064 | 4/1949 | Westcott, Jr. | 244/102 |
| 2,690,888 | 10/1954 | Hawkins, Jr. | 244/102 |
| 2,942,805 | 6/1960 | Zimnoch | 244/63 |
| 3,062,485 | 11/1962 | Hartel | 244/104 |
| 3,178,132 | 4/1965 | Wood et al. | 244/63 |
| 3,370,811 | 2/1968 | Boody | 244/63 |
| 4,401,285 | 8/1983 | Simmonds | 244/63 |
| 4,907,761 | 3/1990 | Derrien et al. | 244/63 |
| 5,029,775 | 7/1991 | Abramovitsh | 244/102 A |

OTHER PUBLICATIONS

Article—*Air Enthusiast* "Crusader III, The Best They ever Cancelled," by Mike Badrocke, Jul.–Aug. 1995, p. 39.
Book—*The World's Great Attack Aircraft* "Thunderbolt II: Rough, Tough, Slow and Low," Oriole Publishing, London, Aerospace Publishing 1988; pp. 116–126; Production Editor: Roy Wilkinson; ISBN 1870 318 05 6.

*Primary Examiner*—Virna Lissi Mojica
*Attorney, Agent, or Firm*—Robert H. Sproule

[57] ABSTRACT

A nose landing gear assembly for an airplane which can be launched with catapult assistance. The landing gear assembly includes a nose strut, upper drag link, lower drag link, launch bar and launch bar actuator. When the nose shut is in the extended position, the upper drag link, lower drag link and launch bar form a direct load path between the catapult shuttle and the airplane thereby avoiding subjecting the nose strut to loads reacted from the shuttle. The nose strut, launch bar, launch bar actuator and airplane fuselage form a first four bar linkage. Furthermore, the nose strut, upper drag link, lower drag link and airplane fuselage form a second four bar linkage such that during retraction of the nose strut, the launch bar, launch bar linkage, upper drag link and lower drag link are caused to move up and into the airplane wheel well.

5 Claims, 10 Drawing Sheets

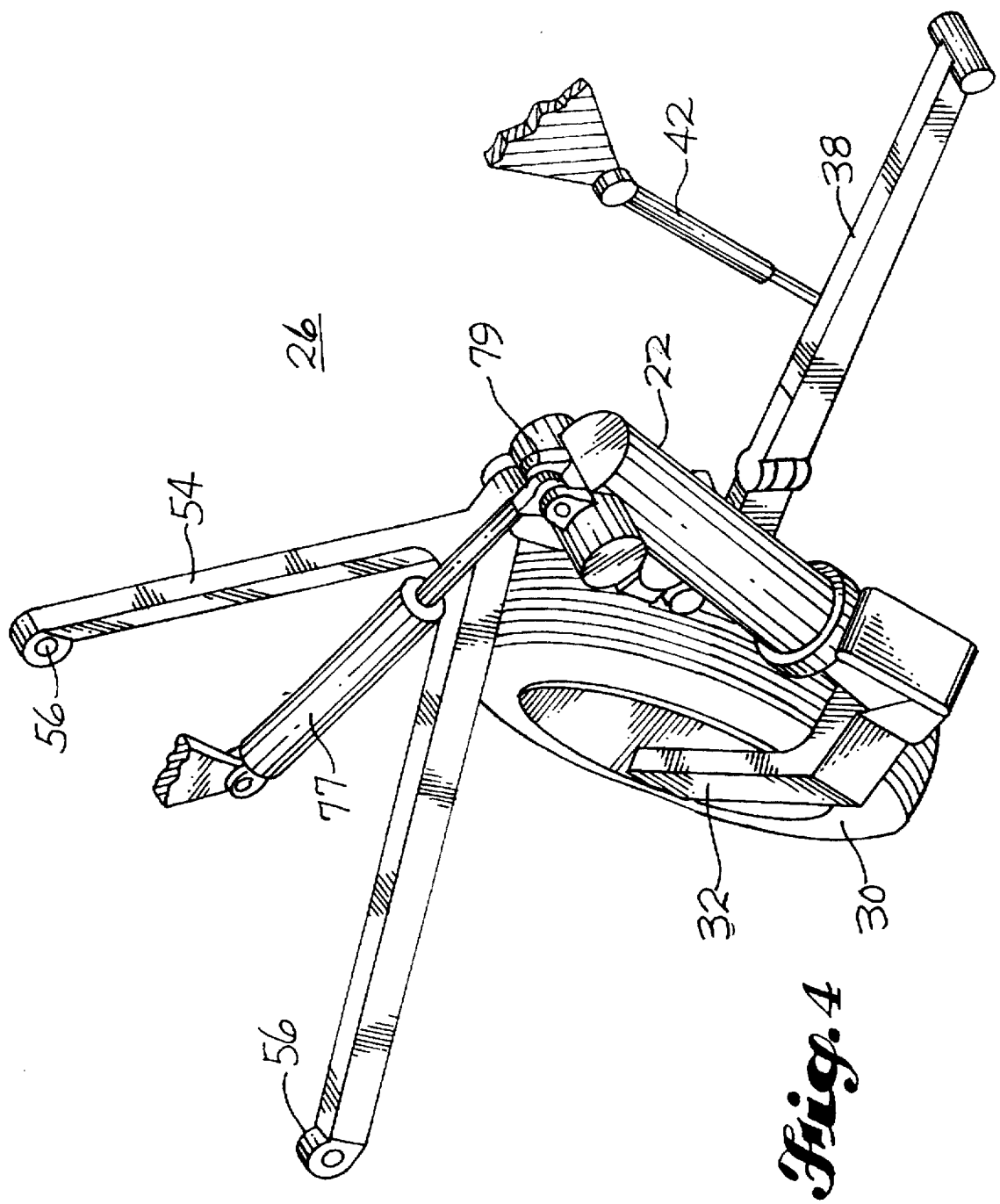

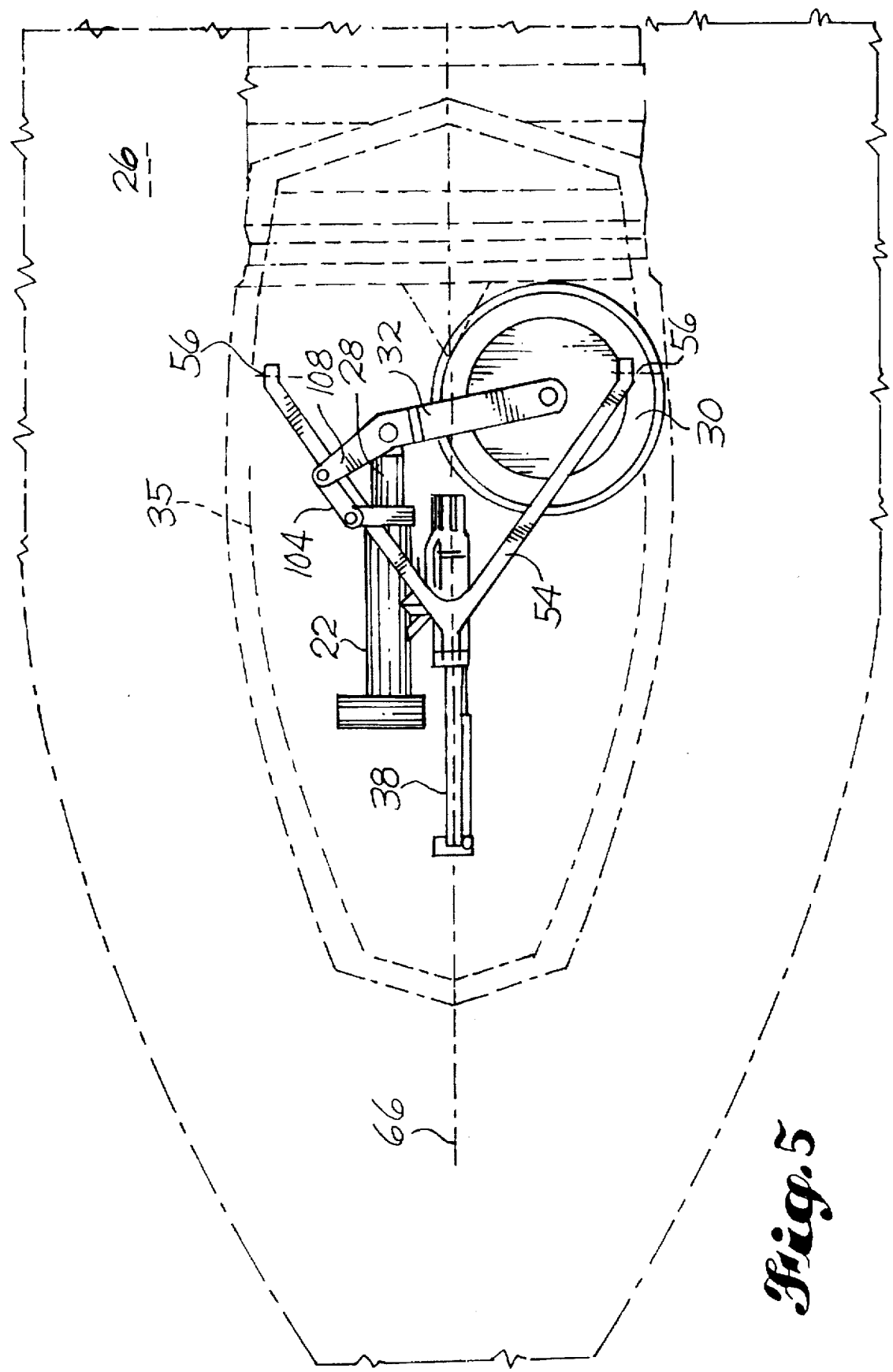

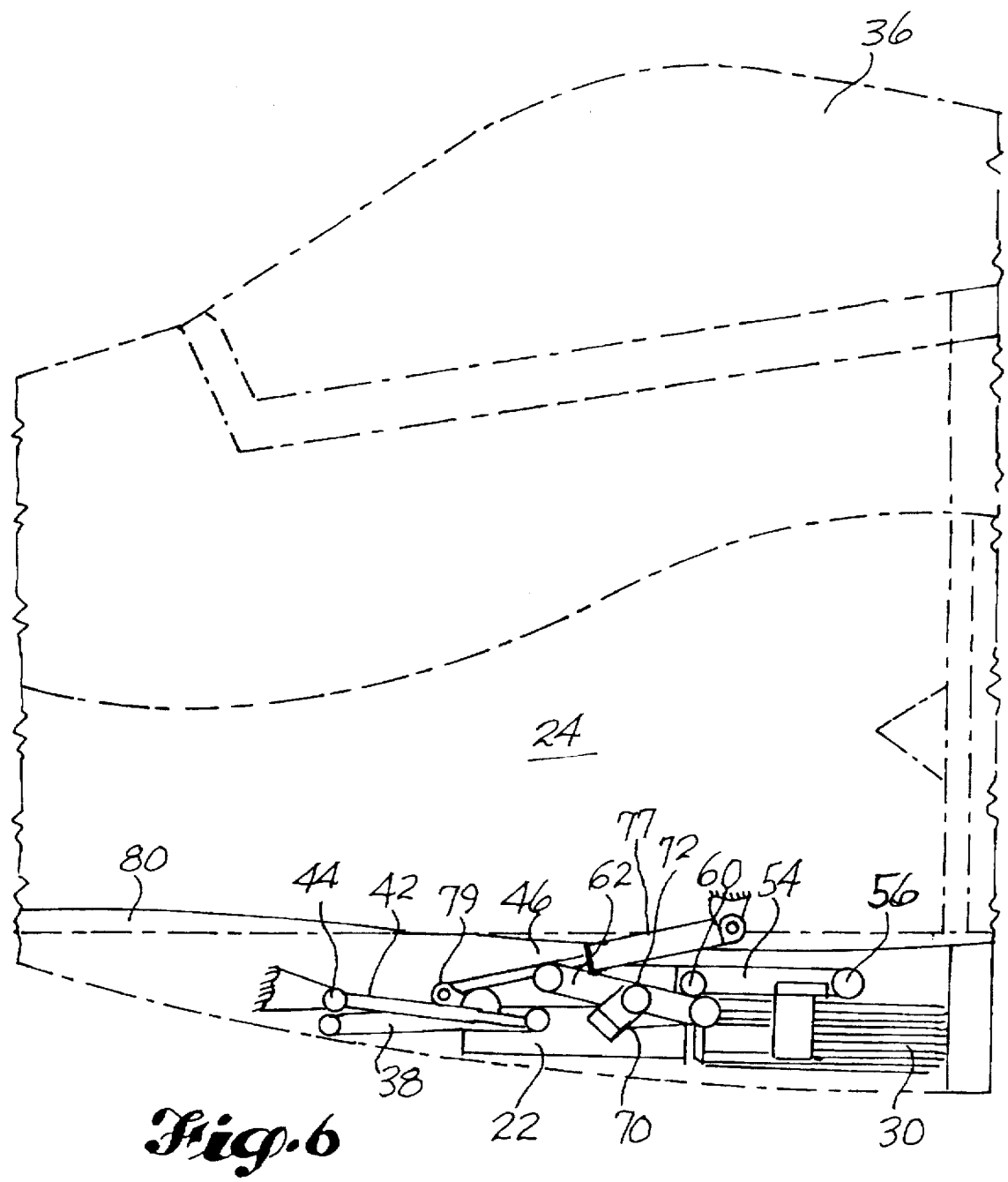

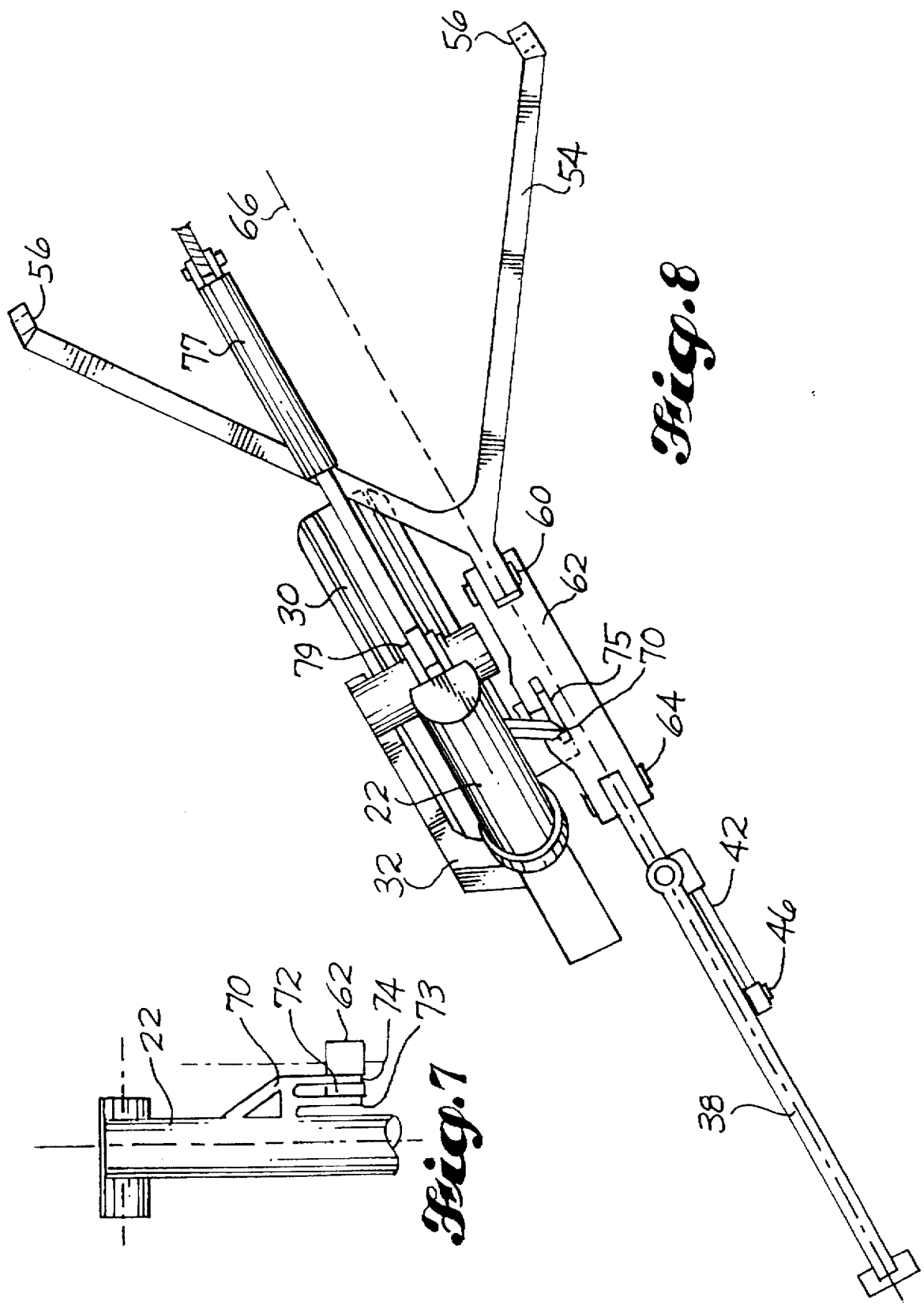

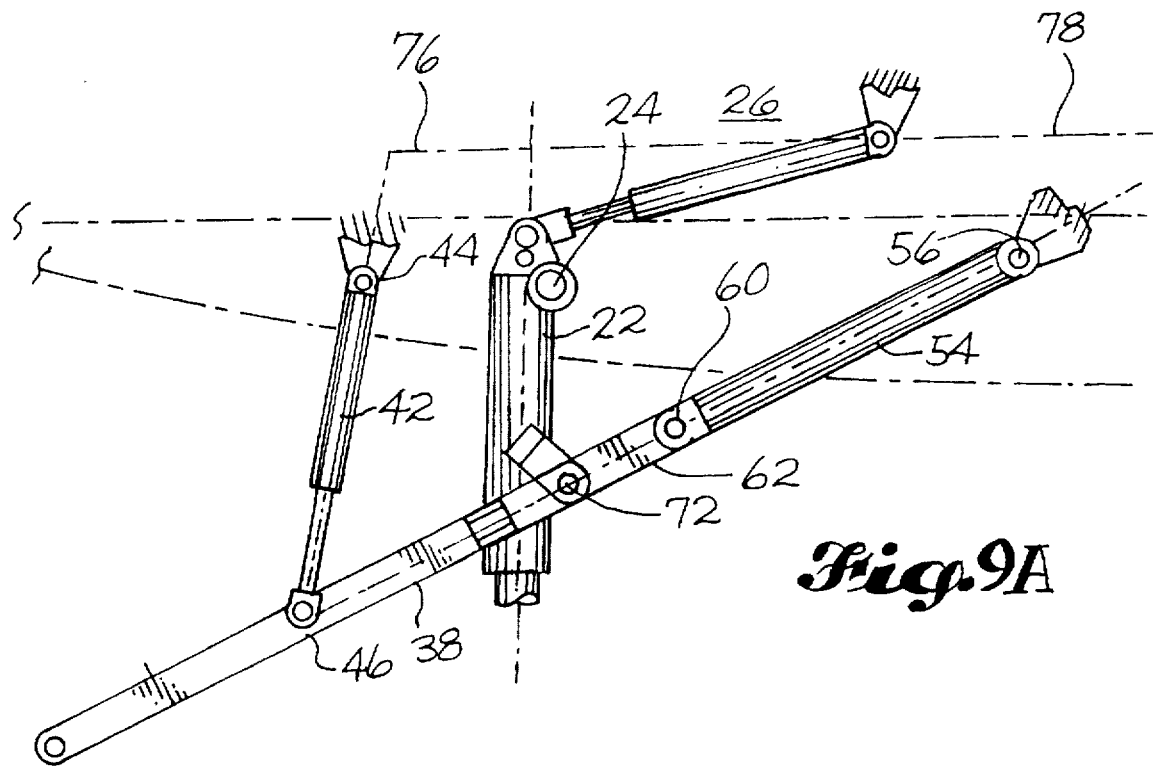
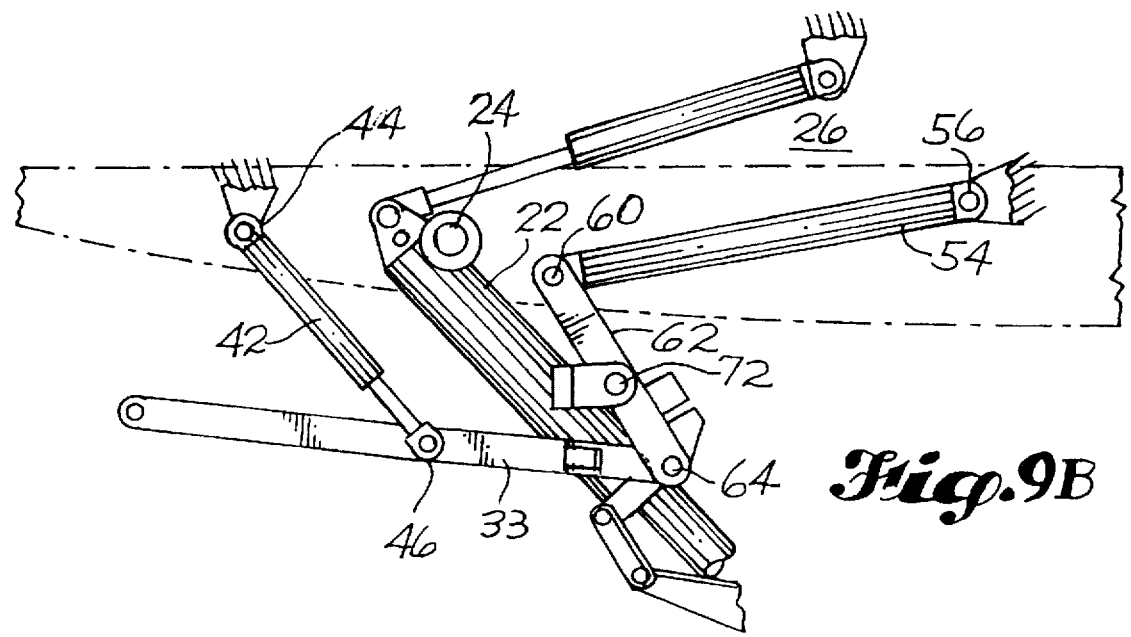

NOSE LANDING GEAR ASSEMBLY FOR A CATAPULT LAUNCHED AIRPLANE

TECHNICAL FIELD

The present invention relates to a retractable nose landing gear for an airplane, and more particularly to an airplane nose landing gear having a mechanism which allows for catapult launching of the airplane.

BACKGROUND OF THE INVENTION

Carrier based airplanes are launched from the bow of the carrier with the assistance of a catapult. The catapult includes a shuttle which projects slightly above the flight deck and which rides in a catapult track (slot) located in the forward part of the flight deck. When the launch order is given, the shuttle is propelled rapidly forward along the catapult track by a catapult mechanism located below the flight deck.

In order to attach the airplane to the catapult shuttle, the airplane nose gear assembly includes a launch bar. Prior to launch, the airplane taxis to a position behind the shuttle at which time the launch bar is lowered and as the airplane taxis further forward the launch bar drops into and engages the catapult shuttle. In addition, a holdback bar is connected between the nose gear assembly and a holdback fitting which is permanently attached to the carrier deck.

After the launch bar and holdback bar are in place, the aircraft brakes are released and the aircraft engine is throttled up to maximum power with the aircraft being held in position by the holdback bar. Once the launch signal is given, the catapult shuttle is caused to move rapidly forward. This causes the holdback bar to release from the nose gear assembly, allowing the shuttle to pull the airplane rapidly forward down the flight deck. Once in the air, the nose gear is retracted into the wheel well along with the launch bar.

Those naval aircraft which utilize the aforementioned catapult launch mechanism have nose gears which employ two side-by-side nose wheels. This allows the launch bar to be connected to the nose gear and to extend forward between the nose wheels along the centerline of the airplane. Thus during the catapult launch sequence, the direction of shuttle travel is in alignment with the centerline of the airplane. Likewise, the holdback bar is located along the centerline of the airplane. This is to avoid any off center loads which could fracture the launch bar and/or prematurely separate the holdback bar if they were not in alignment with the aircraft centerline.

Conventional nose gear design practice for catapult launched airplanes is to provide a single oleo shock absorbing strut located on the aircraft centerline having two side-by-side nose wheels. The tires, one on each side of the strut, straddle the catapult shuttle during catapult launch. Spacing of the tires is determined by the shuttle width. Structural attach points for the launch bar and holdback bar are on the forward and aft portions of the oleo cylinder respectively.

Tires sizes for carrier operation depend on a large number of variables. As the aircraft size and weight shrink, one of the key determinants for the lower limit of tire size is the ability of the wheel/tire combination to roll over obstructions such as arresting gear cables which are present on the carrier deck. Hence tire size shrinks with aircraft weight only to the point allowed by these carrier deck obstructions.

All of the above conditions exact a penalty whereby nose landing gear for carrier aircraft are typically larger than those for land based equivalent aircraft which do not need twin tires, launch bars or holdback bars, and do not need to roll over carrier deck obstructions. In particular, the need for twin tires creates a substantial increase in required volume to house the retracted nose gear as well as a substantial increase in weight.

Every component in the overall aircraft design should be sized to the minimum weight and volume. In the case of the nose gear assembly, it is sometimes preferable to utilize one nose wheel instead of two. This not only reduces the weight of the nose gear assembly, but it also reduces the size of the wheel well for receiving the nose gear when it is retracted.

However, when using one nose wheel instead of two, it is still important that the nose gear strut, launch bar and holdback bar be located along the centerline of the airplane (in the extended position) for catapult launching of the airplane.

In addition, it is desirable that when the nose gear is retracted, the nose gear assembly, including the nose wheel, be located near the airplane centerline.

A number of conventional airplane nose gears have been disclosed. For example, U.S. Pat. No. 2,942,805 by Zimnoch pertains to an airplane nose landing gear assembly having twin tires as well as a catapult launch bar and a holdback bar which are connected to the nose strut.

In addition, U.S. Pat. No. 3,062,485 by Hartel discloses an airplane nose landing gear assembly having twin tires and a catapult launch bar which is connected to the nose strut.

U.S. Pat. No. 3,370,811 discloses an airplane nose landing gear assembly having one or two tires as well as a catapult launch bar and holdback bar.

SUMMARY OF THE INVENTION

The present invention pertains to a landing gear assembly for airplane which uses a catapult for takeoff assistance. The assembly includes a nose strut which is movable between an extended position for supporting the airplane when the airplane is not in flight and a retracted position when the airplane is in cruise flight. In addition there is a drag link assembly which is connected to the airplane and a launch bar which is connected to the drag link assembly. The drag link assembly has a first end which is adapted for connection to the catapult shuttle in a manner that any forces resulting from movement of the catapult shuttle are reacted through the launch bar and drag link assembly to the airplane thereby avoiding the nose strut. In addition there are means for connecting the nose strut to the drag link assembly such that when the nose strut is moved from the retracted position to the extended position the launch bar is caused to move with the nose strut from a retracted position to an extended position in a downward direction from the airplane.

It is an object of the present invention to provide a nose gear assembly having one nose wheel instead of two.

It is another object to provide a nose gear assembly which is lighter in weight than conventional nose gear assemblies for catapult launched airplanes.

It is a further object to provide a nose gear assembly which occupies a smaller volume in the retracted position than conventional nose gear assemblies for catapult launched airplanes.

It is another object to provide a nose gear assembly using one nose wheel for a catapult launched airplane wherein the launch bar and holdback bar are located along the centerline of the airplane.

It is another object to provide a nose gear assembly having one nose wheel wherein when the nose gear is retracted, that the nose gear assembly including the nose wheel are located near the airplane centerline.

BRIEF DESCRIPTION OF THE DRAWINGS

These and other objects and features of the present invention will be discussed in the following detailed description in conjunction with the attached drawings, in which:

FIG. 4 is a perspective view of the starboard side of the airplane nose gear assembly in a partially retracted position;

FIG. 5 is a top view of the retracted nose gear assembly and a forward portion of the airplane fuselage;

FIG. 6 is a side view of the retracted nose gear assembly and a forward portion of the airplane fuselage;

FIG. 7 is a front view of a portion of the nose strut and integral arm;

FIG. 8 is a top view of the extended nose gear assembly;

FIGS. 9A and 9B are schematic representations of two four bar linkages which form a portion of the nose gear assembly wherein FIG. 9A shows the assembly fully extended and FIG. 9B shows the assembly partially retracted;

DETAILED DESCRIPTION

Figure 1:
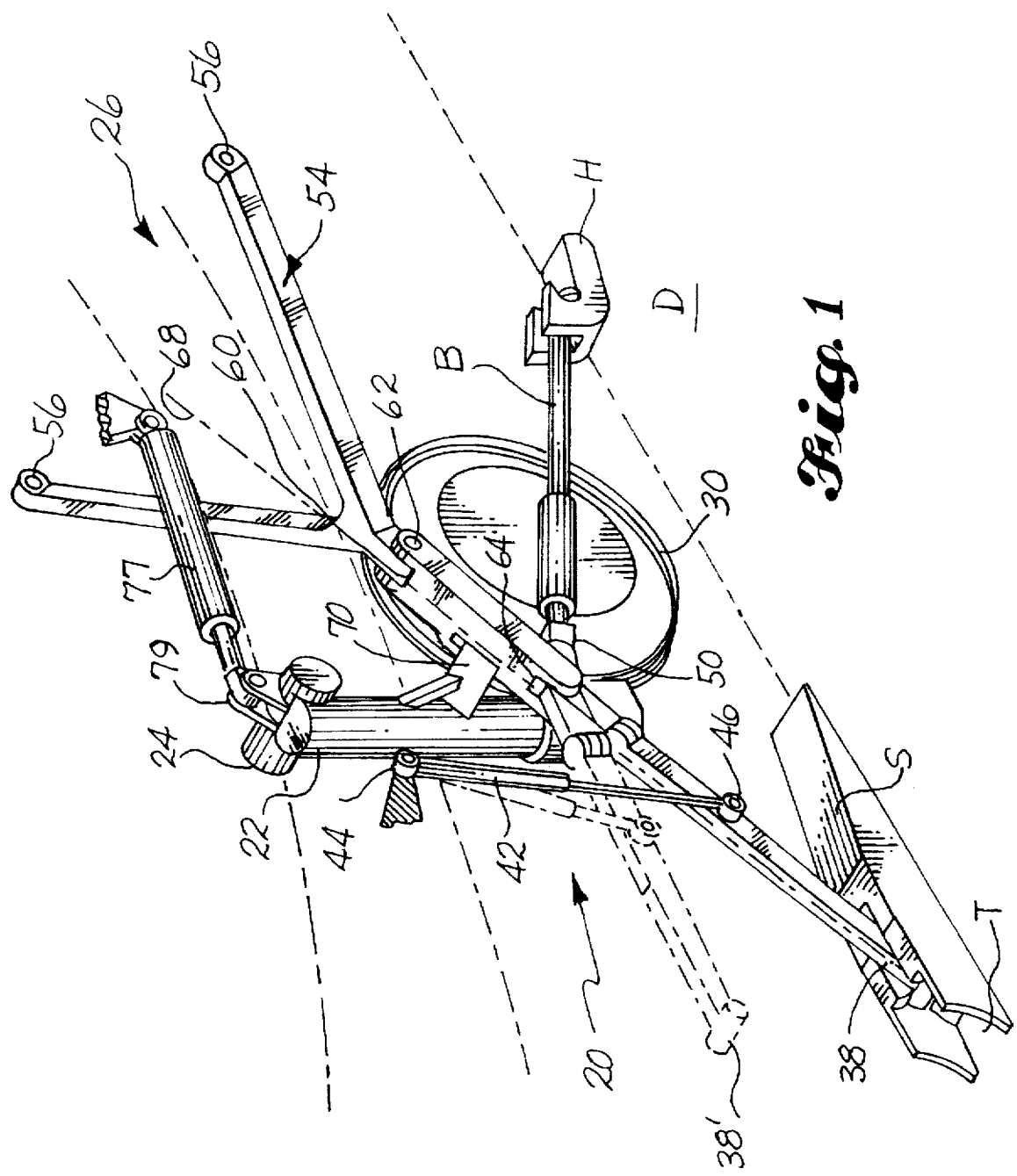
FIG. 1 is a side perspective view of the port side of the airplane nose gear assembly of the present invention in an extended position.
Figure 2:
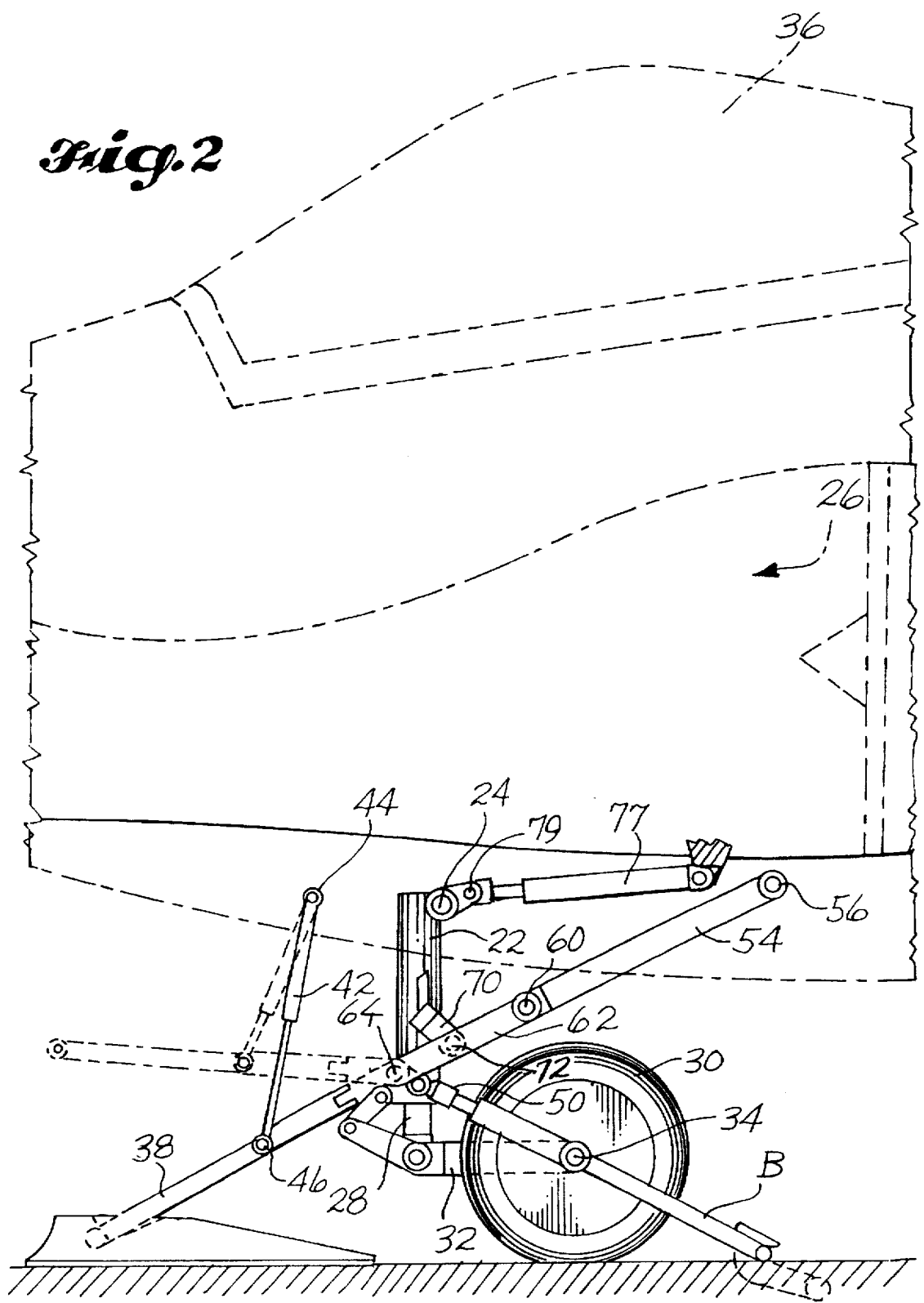
FIG. 2 is side view of the extended nose gear assembly and a forward portion of the airplane fuselage.

Before discussing the invention in detail, an overview of the invention and its operation will be provided. There is shown in FIG. 1 an airplane nose gear assembly generally indicated at 20 which includes an vertical nose gear strut 22 having an upper end which is connected at a pivot connector 24 to an airplane indicated at 26 (FIG. 2). The lower end of the strut 22 includes an oleo 28. In order to attach a nose wheel 30 to the strut 22, a trailing arm assembly indicated at 32 is connected to the bottom of the oleo 28. The trailing arm assembly 32 includes an axle 34 to which the nose wheel 30 is mounted.

As further shown in FIG. 1, the airplane 26 is positioned on an aircraft carrier deck D having a catapult shuttle S which is located in a catapult track T. Located aft (rightward in FIG. 1) of the shuttle S is a holdback fitting H which is rigidly mounted to the deck D.

Figure 3:
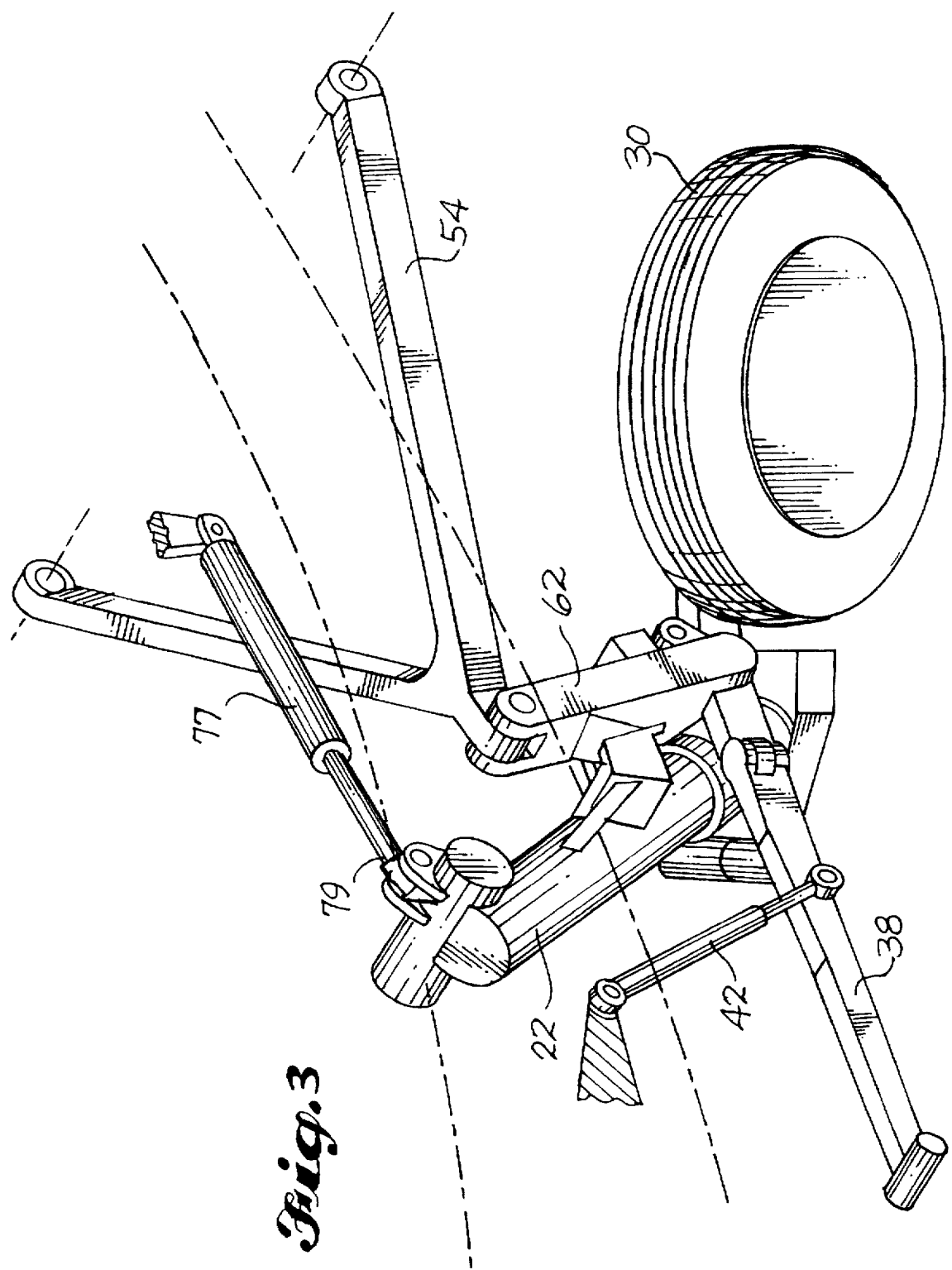
FIG. 3 is perspective view of the port side of the airplane nose gear assembly of the present invention in a partially retracted position.

When the airplane is on the deck, the nose gear is in the extended position as shown in FIG. 1. However, once airborne, it is desirable to retract the nose gear assembly through an intermediate position shown in FIGS. 3 and 4 to a fully retracted position inside an opening (wheel well) 35 in the bottom of the fuselage below the cockpit 36 as shown in FIGS. 5 and 6.

In order to connect the nose gear assembly to the shuttle S (FIG. 1), the assembly includes a launch bar 38 which is shown by phantom lines in a raised position 38' when the airplane is taxing about the carrier deck, and by solid lines in a lowered position where the lower end of the launch bar 38 is attached to the shuttle S in preparation for launching assistance by the catapult.

The launch bar 38 is lowered by means of a launch bar linear actuator 42 which is connected to the airplane 26 at a pivot connector 44 and to the launch bar 38 at a pivot connector 46. The launch bar 38 is biased to the raised position in a conventional manner by springs (not shown) which extend between the launch bar 38 and the airplane.

In order to restrain the airplane when its engine is a full power just prior to catapult launch, a holdback bar B is connected between the holdback fitting H and the nose gear assembly. The holdback bar B is attached to the nose gear assembly in a conventional manner at a fitting 50 of the nose gear assembly. The holdback barb automatically releases from the nose gear assembly during initiation of the catapult forward stroke thereby allowing the airplane to be pulled forward down the deck for launching by the catapult shuttle.

Having completed the brief overview, further details of the present invention will be described. Still referring to FIG. 1, support for the nose gear is also provided by a Y-shaped upper drag link assembly indicated at 54. The upper drag link 54 has a Y-shape so that it can be connected to airplane keel members (not shown) which are located on either side of the airplane engine (also not shown). The upper ends of the drag link 54 are connected at pivot connectors 56 to the airplane 26 (FIG. 2). The lower end of the upper drag link 54 is connected at a pivot connector 60 to the upper end of a lower drag link 62. The upper end of the launch bar 38 is connected at a pivot connector 64 to the lower end of the drag link 62.

Figure 10:
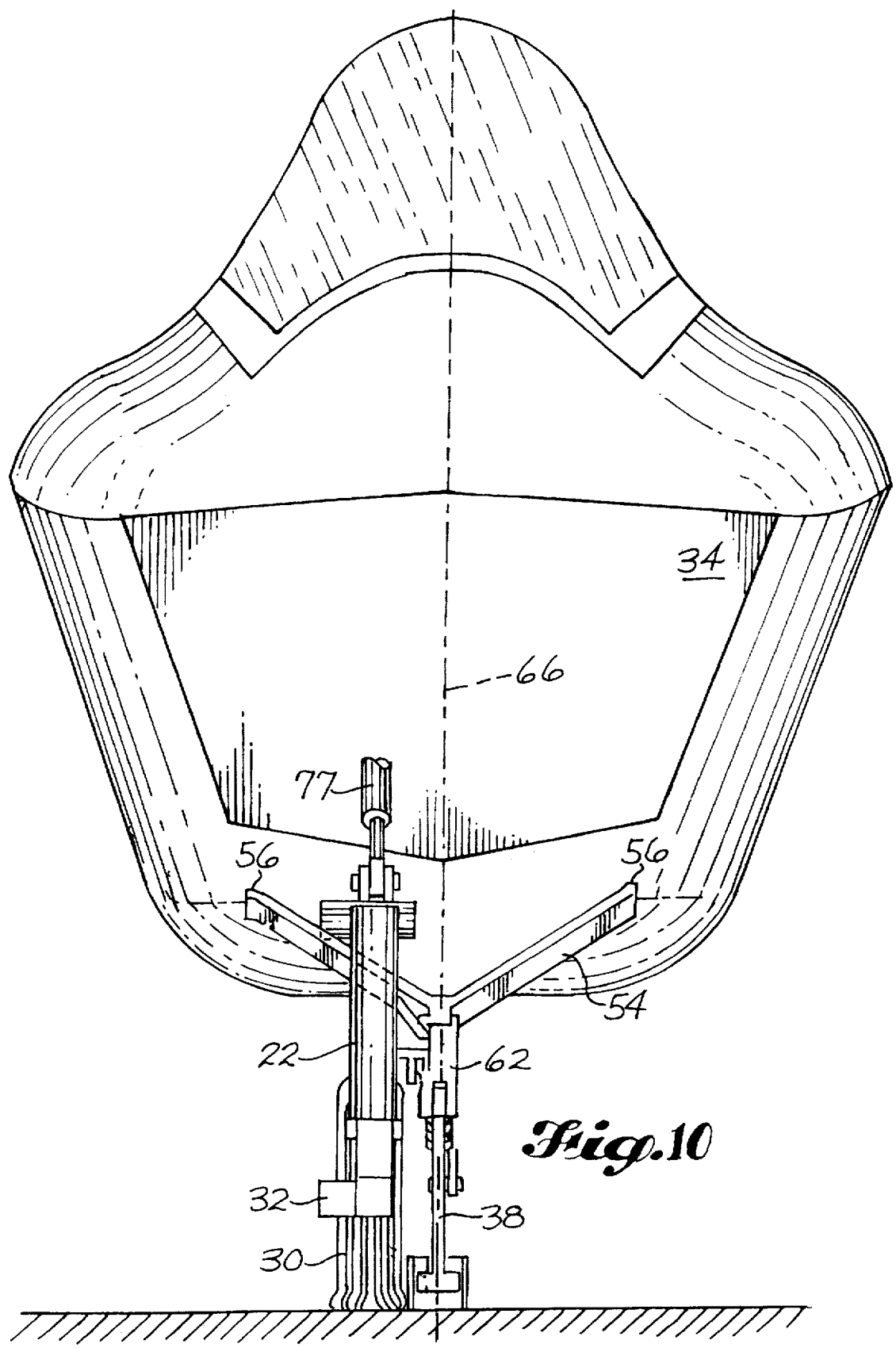
FIG. 10 is a front view of the extended nose gear assembly and fuselage portion of the airplane.

As shown in FIG. 1, during the launch phase, a direct linear load path (represented by the dashed line 68) between the shuttle S and the airplane fuselage 26 is formed by the combination of the launch bar 38, lower drag link 62 and upper drag link 54. This direct load path is the optimum method of transferring the launch loads from the shuttle to the airplane frame. It has the further advantage of being located directly in line with the airplane centerline which is represented by a dashed line identified by the number 66 in FIG. 10. In addition, the load path 68 avoids the nose strut 22 which is located adjacent to the drag link 62. In this manner, the large loads of the catapult launch bypass the nose shut and are transmitted directly to the airplane along its centerline.

It is desirable, however, that the launch bar 38 extend and retract with the nose gear. This is accomplished in the present invention by connecting the nose gear strut 22 to the lower drag link 62 by an integral fixed arm 70 (FIG. 1) which extends downward and rearward from the strut 22. The arm 70 is connected to the lower drag link 62 at a pivot connector 72 (FIG. 2) so as to cause the lower drag link 62 to move with the arm 70 during extension and retraction of the nose strut 22.

As shown in FIGS. 7 and 8, the arm 70 of the strut 22 includes two forks 73, 74, one of which extends downward adjacent the drag link 62 and the other extends downward through a vertical slot 75 in the drag link 62. The pivot connector 72 extends through the forks 73,74 and the portion of the drag link 62 between the forks in order to join the strut 72 to the drag link 62.

As shown most clearly in FIG. 9A, the combination of the airplane fuselage 26, actuator 42, launch bar 38 and nose strut 22 from a first four bar linkage shown by the dashed lines which are identified by the number 76. In addition, a second four bar linkage, shown by dashed lines identified by the number 78, is formed by the airplane fuselage 26, the nose strut 22 (which is also common to the four bar linkage 76), lower drag link 62 and upper drag link 54.

Retraction and extension of the nose gear strut 22 is accomplished by a linear actuator 77 (FIG. 1) which is connected at one end to the airplane 26 and which is connected at its other end to a crank arm 79 which in turn is attached to the upper end of the strut 22. Extension of the actuator 77 causes the gear to retract, whereas retraction of the actuator 77 causes the gear to extend.

During the retraction sequence, as the nose gear rotates in a counterclockwise direction about the pivot 24 as shown in FIG. 9B, the actuator 42 is caused to rotate in a counterclockwise direction about the pivot 44. At the same time, the launch bar 38 is caused to move in a rearward (rightward in FIG. 9B) and upward direction toward the airplane 26 and into the wheel well.

During retraction of the nose gear 22 the lower end of lower drag link 62 is caused to move rearward and upward relative to the airplane 26 while the upper end of the drag link 62 is caused to move forward and upward. At the same time, the lower end of the upper drag link 54 is caused to rotate in a clockwise direction about pivot 56 upward toward the airplane fuselage.

This retraction sequence continues until the nose gear assembly is in the fully retracted position (FIGS. 5 and 6) wherein the upper drag link 54, nose gear strut 22 and launch bar 38 are stowed in a manner generally parallel to a horizontal plane (indicated by a dashed line 80 in FIG. 6) inside the airplane wheel well 35. At the same time, the actuator 42 and lower drag link 62 extend downward slightly in a right-to-left direction (when viewing FIGS. 5 and 6) inside the airplane wheel well.

During the retraction sequence, the trailing arm assembly 32 (and the nose wheel 32 therewith) are caused to rotate about the nose strut 22 in a clockwise direction (when viewing FIG. 4) so that the nose wheel 30 is moved from a position where it is generally perpendicular to the horizontal plane 80 when the nose strut is in the extended position to a position where the nose wheel 30 is generally parallel to the horizontal plane 80 (FIG. 6) when in the fully retracted position. This rotation of the nose wheel during the retraction and extension sequence is accomplished automatically by conventional means (not shown) and is not a part of this invention. Suitable means for accomplishing this rotation is the mechanism currently on the main landing gear of the United States Navy A-4 attack airplane.

As shown more clearly in FIG. 5, when retracted it is necessary that the nose gear assembly fit inside the wheel well 35. In order to accomplish this, when the nose gear assembly is retracted into the wheel well it is important that the nose wheel 30 be located as close to the airplane centerline (represented by the dashed line 66) as possible. This is accomplished in the present invention by offsetting the strut 22 from the centerline 66 of the aircraft as shown best in FIG. 10.

Figure 11:
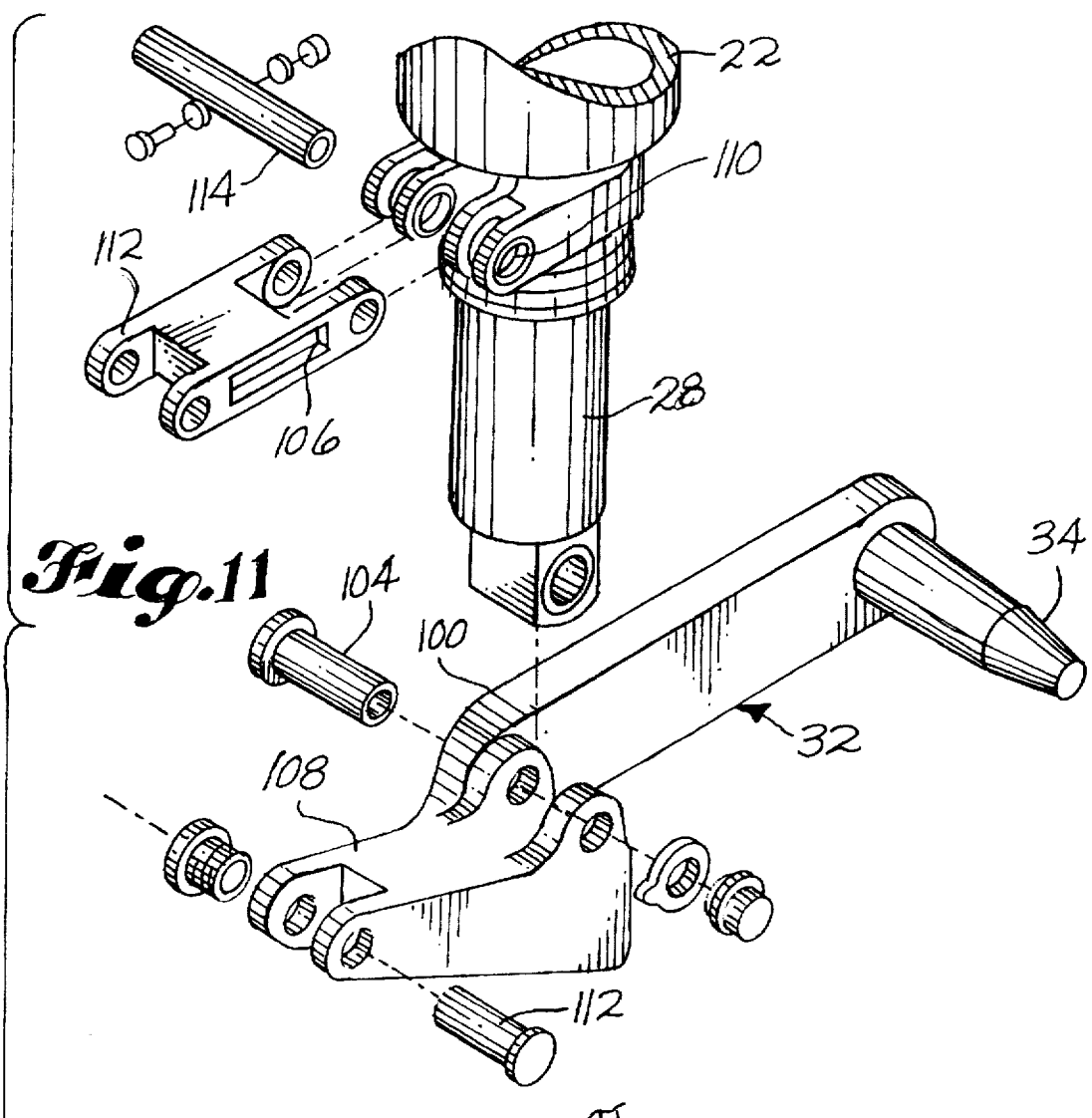
FIG. 11 is an exploded view of the trailing arm assembly and a portion of the nose strut.
Figure 12:
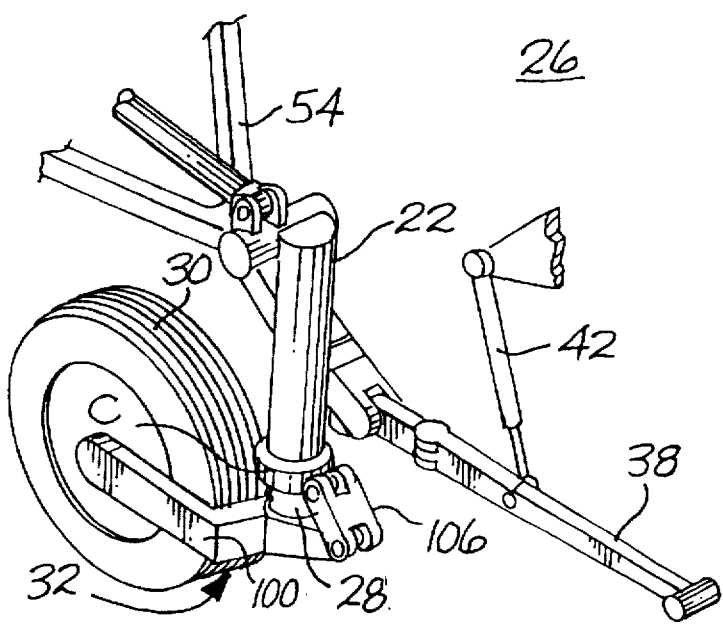
FIG. 12 is a perspective view of the starboard side of the nose gear assembly in a fully extended position.

There is shown in FIGS. 11 and 12 the trailing arm assembly 32 which includes an axle beam 100 which extends rearward along the starboard side of the wheel 30 and which includes the axle 34 for supporting the nose wheel 30 directly behind the strut 22. The axle beam 100 is pivoted to the lower end of the oleo 28 by a pin 104.

In order to regulate the extension of the oleo 28, a tension link 106 is mounted between a beam 108, which extends from the axle beam 100 forward of the oleo 28, and a collar 110 which is mounted about the lower end of the strut 22.

The lower end of the tension link 106 is connected to the beam 108 at a pivot connector 112, and the upper end of tension link 106 is connected to the collar 110 at a pivot connector 114.

What is claimed is:

1. A landing gear assembly for an airplane which uses a catapult shuttle for takeoff assistance, the assembly comprising:

a. a nose strut which is movable between an extended position for supporting the airplane when the airplane is not in flight and a retracted position;

b. drag link means which are connected to the airplane and which include an upper drag link and a lower drag link which are connected together such that the lower drag link is connected to the nose strut and the upper drag link is connected to the airplane and such that a first linkage is formed by a combination of the airplane, the upper drag link, the lower drag link and the nose strut such that when the nose strut is in the extended position a launch bar extends away from the lower drag link along a common linear axis with the lower drag link and when the nose strut is in the retracted position the launch bar and the lower drag link have intersecting linear axes;

c. the launch bar is connected to the drag link means and which has a first end connection which is adapted for connection to the catapult shuttle in a manner that any forces resulting from movement of the catapult shuttle are reacted through the launch bar and drag link means to the airplane; and d. means for connecting the nose strut to the drag link means such that when the nose strut is moved from the retracted position to the extended position the launch bar is caused to move with the nose strut from a retracted position to an position that extends away from the airplane.

2. The landing gear assembly as set forth in claim 1 wherein:

a. the nose strut is generally vertical when in the extended position and generally horizontal when in the retracted position; and b. the first linkage is connected in a manner that the upper drag link is caused to move between a generally horizontal position when the nose strut is in the retracted position and a position extending away from the airplane when the nose strut is in the extended position.

3. The landing gear assembly as set forth in claim 1 wherein:

a. the landing gear assembly additionally comprises an actuator for moving the launch bar between a first raised position and a second lowered position; and b. a second linkage is formed by a combination of the airplane, the actuator, the launch bar and the nose strut such that when the nose strut is in the extended position the actuator extends away from the airplane to the launch bar and when the nose strut is in the retracted position the actuator extends generally laterally from the airplane to the launch bar.

4. The landing gear assembly as set forth in claim 3 wherein:

a. the nose strut is generally vertical when in the extended position and generally horizontal when in the retracted position; and b. the second linkage is connected in a manner that the second linkage causes movement of the actuator between a generally horizontal position when the nose strut is in the retracted position and a position extending away from the airplane when the nose strut is in the extended position.

5. A landing gear assembly for airplane which uses a catapult shuffle for takeoff assistance, the assembly comprising:

a. a nose strut which is movable between an extended position for supporting the airplane when the airplane is not in flight and a retracted position such that the nose strut is generally vertical when in the extended position and generally horizontal when in the retracted position;

b. drag link means which includes an upper drag link which is connected to the airplane and a lower drag link which is connected to the upper drag link;

c. a launch bar which is connected to the lower drag link and which has a first end connection which is adapted for connection to the catapult shuttle in a manner that any forces resulting from movement of the catapult shuttle are reacted through the launch bar and drag link means directly to the airplane and bypass the nose strut;

d. an actuator for moving the launch bar between a first raised position and a second lowered position such that a linkage is formed by a combination of the airplane, the actuator, the launch bar and the nose strut; and e. means for connecting the nose strut to the drag link means such that when the nose strut is moved from the retracted position to the extended position the linkage causes the actuator and the launch bar to move with the nose strut from a retracted position to an extended position that extends away from the airplane.

* * * * *